US008719023B2

(12) United States Patent
Menendez-Pidal et al.

(10) Patent No.: US 8,719,023 B2
(45) Date of Patent: May 6, 2014

(54) ROBUSTNESS TO ENVIRONMENTAL CHANGES OF A CONTEXT DEPENDENT SPEECH RECOGNIZER

(75) Inventors: Xavier Menendez-Pidal, Campbell, CA (US); Ruxin Chen, Redwood City, CA (US)

(73) Assignee: Sony Computer Entertainment Inc., Tokyo (JP)

(*) Notice: Subject to any disclaimer, the term of this patent is extended or adjusted under 35 U.S.C. 154(b) by 500 days.

(21) Appl. No.: 12/785,375

(22) Filed: May 21, 2010

(65) Prior Publication Data

US 2011/0288869 A1 Nov. 24, 2011

(51) Int. Cl.
*G10L 15/14* (2006.01)

(52) U.S. Cl.
USPC ........ 704/256.1; 704/246; 704/247; 704/251; 704/252; 704/257

(58) Field of Classification Search
USPC ........ 704/8–10, 256–257, 246, 247, 251, 252
See application file for complete search history.

(56) References Cited

U.S. PATENT DOCUMENTS

| 5,806,030 | A | 9/1998 | Junqua |
| 5,825,978 | A | 10/1998 | Digalakis et al. |
| 5,999,893 | A * | 12/1999 | Lynch et al. ................. 702/181 |
| 6,324,510 | B1 * | 11/2001 | Waibel et al. ............. 704/256.7 |
| 6,405,168 | B1 * | 6/2002 | Bayya et al. ................. 704/256 |
| 7,467,086 | B2 | 12/2008 | Menendez-Pidal et al. |
| 2002/0174086 | A1 * | 11/2002 | Verma et al. ................. 707/1 |
| 2009/0106023 | A1 * | 4/2009 | Miki ............................ 704/245 |
| 2009/0222266 | A1 | 9/2009 | Sakai |

OTHER PUBLICATIONS

Communication pursuant to Rule 62 EPC for European Patent Application No. 11153813.8-2225. Mailed Jun. 20, 2011, 6 pages.
Ying Jia et al., "Dynamic Threshold Setting Via Bayesian Information Criterion (BIS) in HMM Training", Oct. 16, 2000, XP007011063, Sections 1, 3, and 4, 4 pages.
Park, J. et al., "Effective Acoustic Model Clustering Via Decision-Tree with Supervised Learning", Speech Communication, Elvsevier Science Publishers, Amsterdam, NL, vol. 46, No. 1, May 1, 2005, XP025258495, ISSN: 0167-06393, Sections 1 and 2, pp. 1-13.
Xavier Menendez-Pidal et al., "Development of the Compact English LVCSR Acoustic Model for Embedded Entertainment Robot Applications", International Journal of Speech Technology, Kluwer Academic Publishers, BO, vol. 10, No. 2-3, Jan. 10, 2009, XP019677313, pp. 63-74.

(Continued)

*Primary Examiner* — Leonard Saint Cyr
(74) *Attorney, Agent, or Firm* — Blakely, Sokoloff, Taylor & Zafman LLP

(57) ABSTRACT

An apparatus to improve robustness to environmental changes of a context dependent speech recognizer for an application, that includes a training database to store sounds for speech recognition training, a dictionary to store words supported by the speech recognizer, and a speech recognizer training module to train a set of one or more multiple state Hidden Markov Models (HMMs) with use of the training database and the dictionary. The speech recognizer training module performs a non-uniform state clustering process on each of the states of each HMM, which includes using a different non-uniform cluster threshold for at least some of the states of each HMM to more heavily cluster and correspondingly reduce a number of observation distributions for those of the states of each HMM that are less empirically affected by one or more contextual dependencies.

27 Claims, 10 Drawing Sheets

(56) References Cited

OTHER PUBLICATIONS

Pidal, et al., "Development of the Compact English LVCSR Acoustic Model for Embedded Entertainment Robot Applications", Int J. Speech Technology, Springer, pp. 63-74, 2007.

Steve Young, et al., "The HTK Book", Version 3.1, Microsoft corporation, 2000, 277 pages.

S.J. Young, "The General Use of Tying in Phoneme-Based HMM Speech Recognisers", IEEE, 1992, pp. 569-572.

"The DARPA TIMIT Acoustic-Phonetic Continuous Speech Corpus (TIMIT)", National Institute of Standards and Technology, NTIS Order No. PB91-505065, 1990, 11 pages.

S. Young, "HMMs and Related Speech Recognition Technologies", Handbook of Speech Processing, Springer, 2008, pp. 539-557.

J. Droppo et al., Environmental Robustness, Handbook of Speech Processing, Springer, 2008, pp. 653-679.

English Translation of Non-Final Office Action for Japanese Patent Application No. 2011-114519 Mailed May 29, 2012, 5 pages.

English Translation of Non-Final Office Action for Korean Patent Application No. 2011-0031775, Mailed Apr. 18, 2012, 3 pages.

Kataoka, Shunsuke, "Decision-Tree Backing-off in HMM-Based Speech Synthesis", IEICE Technical Report No. 264, IEICE, Sep. 16, 2003, vol. 103, pp. 13-18.

Zen, Heiga, "Decision Tree-based Simultaneous Clustering of Phonetic Contexts, Dimensions, and State Positions for Acoustic Modeling", IEICE Technical Report, IEICE, May 16, 2003, vol. 103, 4 pages.

Non-Final Office Action for Japanese Patent Application No. 2011-114519, Mailed Sep. 11, 2012.

Notice of Allowance for European Patent Application No. 11153813.8, Mailed Sep. 7, 2012.

Notice of Allowance for Japanese Patent Application No. 2011-114519, Mailed Dec. 4, 2012.

Notice of Allowance for Chinese Patent Application No. 201110031004.2, Mailed Mar. 6, 2013, 8 pages.

\* cited by examiner

ROBUSTNESS TO ENVIRONMENTAL
CHANGES OF A CONTEXT DEPENDENT
SPEECH RECOGNIZER

BACKGROUND

1. Field

Embodiments of the invention relate to the field of speech recognition; and more specifically, to improving the robustness to environmental changes of a speech recognizer.

2. Background

Many general purpose speech recognizers are built using a Hidden Markov Model (HMM) and process speech at a speech unit level (e.g., phone, word, function word, syllable, beginning and final syllables, etc.). A phone speech unit is typically a portion of audio (e.g., speech) of a sequence of sounds that is perceptually unique that has been decomposed from a word. For example, the phrase "I Want," may include five distinct phones (ay, w, ao, n, and t in the TIMIT phone system). Each phone may be included in multiple features or frames (the number of which is typically dependent on the length of the phone and which is typically different for different speakers, speech rate, emotional state, etc.). The HMMs typically include multiple states to process different parts of each phone. For example, a three state HMM processes the beginning, nucleus, and the end of each phone in an initial, body, and final state respectively. Left to right HMMs are used in speech recognition where the initial HMM states are defined as entry model states that are not connected from any other entry states except themselves, the final HMM states are terminal model states that are not connected to any other states except themselves, and the body HMM states are any other intermediate states. The previous definition covers also the left to right HMMs with state skipping connections.

Typical speech recognizers use a context independent HMM (e.g., a monophone HMM) or a context dependent HMM (e.g., a biphone (left or right) HMM, demiphone HMM, triphone HMM, etc.). A context independent HMM does not take into consideration neighboring speech units when processing each base speech unit. In contrast, a context dependent HMM takes into account neighboring speech units when processing each base speech unit. For example, a typical biphone HMM takes into account a single neighboring phone (the previous phone is taken into account in left biphone HMMs, and the subsequent phone is taken into account in right biphone HMMS). Each state in a typical triphone HMM takes into account the previous phone and the subsequent phone. The previous definition of initial state, body state, and final state are valid for all left to right HMM monophones, biphones, and triphones. Other context dependent HMMs include demiphones, which are two connected sub-phonetic contextual units. A Demiphone includes a left demiphone part and a right demiphone part. Each demiphone part models a portion of a phone, has only one contextual dependency, and is a normal HMM. A left demiphone part models the phone beginning and takes into account the previous phone, while a right demiphone part models the phone ending and takes into account the subsequent phone. Demiphones can model the phone area evenly or unevenly. When a demiphone unevenly models the phone area one of the demiphone parts is dominant and has more states than the other one. For example, in a left dominant demiphone, the left demiphone part has more states than the right demiphone part. In a right dominant demiphone, the right demiphone part has more states than the left demiphone part. The initial state of a demiphone is an entry model state in the left demiphone part and is not connected from any other entry states except itself. The final state of a demiphone is a terminal model state in the right demiphone part and is not connected to any other states except itself. The body state(s) of a demiphone are the other states of the demiphone (different from the initial state and final state), and may be either included in the left demiphone part and/or the right demiphone part.

The following table illustrates a phone transcription of the sentence "I want" using typical context independent TIMIT monophones, and typical context dependent left biphones, right biphones, triphones, and demiphones.

TABLE 1

| I want | |
| --- | --- |
| Context Independent Monophones | sil ay w ao n t sil |
| Context Dependent Left Biphones | sil sil-ay ay-w w-ao ao-n n-t sil |
| Context Dependent Right Biphones | sil ay+w w+ao ao+n n+t t+sil sil |
| Context Dependent Triphones | sil sil-ay+w ay-w+ao w-ao+n ao-n+t n-t+sil sil |
| Context Dependent Demiphones | sil sil-ay ay+w ay-w w+ao w-ao ao+n ao-n n+t n-t t+sil sil |

Each base speech unit can be represented with state transition probabilities $\{A_{ip}\}$ and output probability observation distributions $\{B_{ip}(O_t)\}$. The output observation distributions are typically multivariate mixtures of Gaussian distributions and determine the probability of generating observation $O_t$ (or input frame) at time t. The output observations are identified by the state index i and the speech unit index p, and the input observation at a time t.

In a context independent HMM, each speech unit (e.g., phone unit, word unit, function word unit, syllable unit, beginning and final syllables unit, etc.) has a single observation distribution for each state. Thus for an English speech recognizer using 40 unique phones and a three state context independent HMM per phone, the system uses a total of 120 observation distributions. Since context dependent HMMs take into consideration neighboring speech unit(s), they use more observation distributions than context independent HMMs. It is not unusual for the number of output observation distributions to range between 1,000 to 5,000 in a typical context dependent HMM speech recognizer. The number of observation distributions for context dependent HMMs can be limited by applying a uniform decision tree clustering algorithm or a uniform data driven clustering algorithm, however these algorithms use a uniform cluster threshold that is the same across each of the states of a phone.

Speech recognizers that use context dependent HMMs are typically more accurate than speech recognizers that use context independent HMMs, however they also generally require more memory and computational resources than speech recognizers using context independent HMMs. In addition, training context dependent HMMs requires significantly more training data than training context independent HMMs. In addition, the training data required to train triphone HMMs is greater than the data required to train biphone HMMs.

Some speech recognizers are trained in a training environment before the system is released, which reduces or eliminates an end user of the system from training the speech recognition system. Often this training environment is optimal for speech recognition where high accuracy is typically obtained. However, the environment of the real commercial scenarios (e.g., environments where the speech recognition system is commercially used) often differs from the training environment (e.g., different noises, etc.) and consequently the accuracy of the speech recognizer decreases. Different environmental variables may be taken into consideration in the training environment (e.g., different noises, reverberation, channel effects, etc.). However, it is possible that the environment that is ultimately used by the end users is different or cannot be taken into consideration during training.

Speech recognizers using typical context dependent biphones are accurate in matched conditions (where the environment is substantially the same during training and usage) but are inaccurate in mismatched conditions (where the environments of training and usage are different). Although accuracy can be improved using a noise robust front-end or back-end technology (e.g., feature transformation and normalization, noise attenuation, speech enhancement, HMM back-end noise compensation, etc.), the accuracy in mismatched conditions may not be acceptable. However, speech recognizers that use typical context independent HMMs (e.g., monophones), while being less accurate in the original training environment, are more robust to environmental changes as compared with speech recognizers using typical context dependent biphones HMMs.

SUMMARY

A method and apparatus for improving robustness to environmental changes for a context dependent speech recognizer while maintaining a low memory footprint and being computationally efficient is described. In one embodiment, an enhanced multiple state context dependent Hidden Markov Model (HMM) is defined or trained to have a reduced number of possible observation distributions for those states that are less affected by contextual dependency(ies).

In some embodiments, a non-uniform state clustering process is used that uses different clustering thresholds for different states. For those states that are less affected by contextual dependency, the value of the cluster threshold is such that the observation distributions are more tied (clustered) as a result of the non-uniform state clustering process being performed, thereby reducing the total number of possible observation distributions for those states. In other embodiments, one or more states of a multiple state context dependent HMM that are less affected by contextual dependency are defined to be context independent, thereby reducing the number of possible observation distributions for those states to a single one.

Reducing the number of observation distributions for an HMM for those states that are less affected by contextual dependency improves the accuracy of the speech recognizer in mismatched conditions (it increases its robustness to environmental changes) as well as reducing the memory and CPU resources required for speech recognition.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
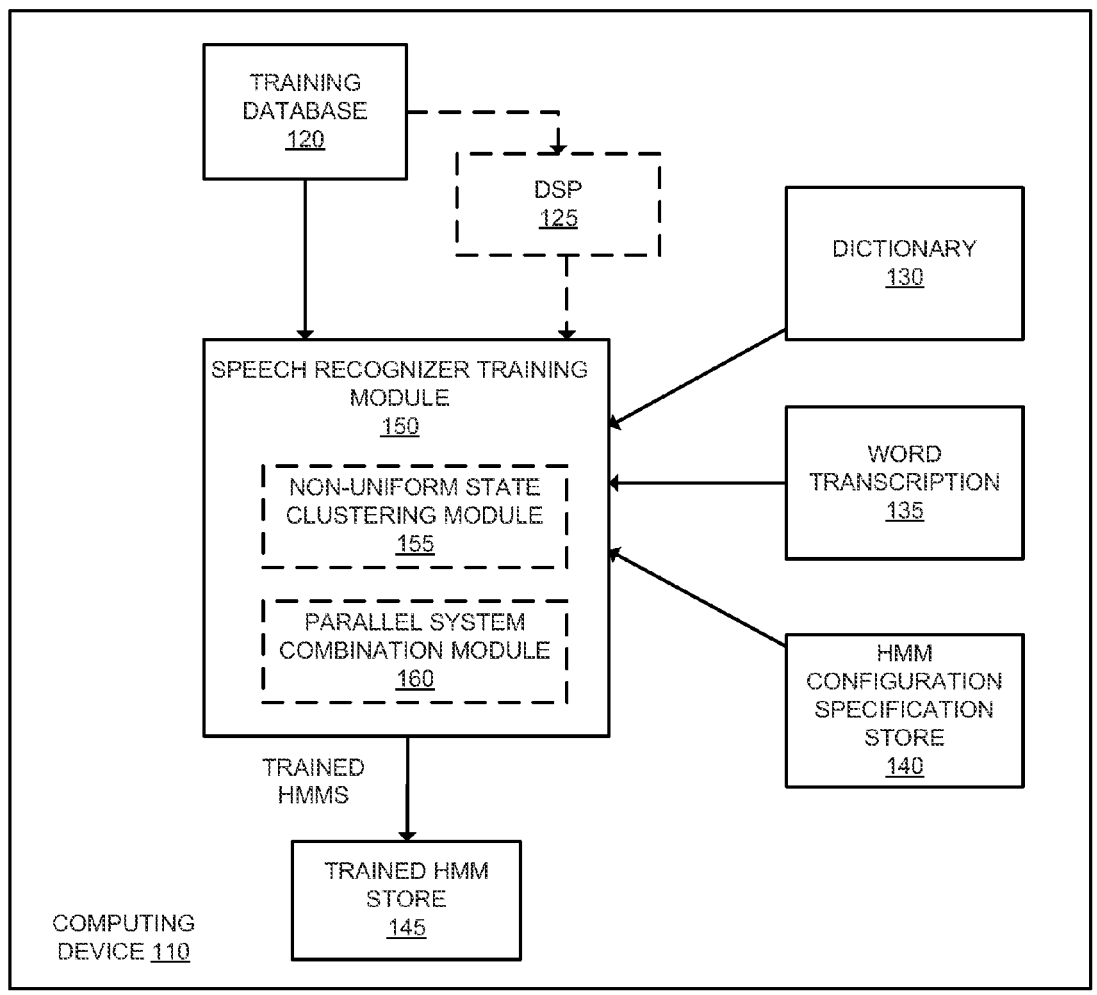
FIG. 1 is a block diagram illustrating exemplary components of the computing device used to train data for a speech recognition application according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for improving robustness to environmental changes for a speech recognizer while maintaining a low memory footprint and being computationally efficient is described herein. In one embodiment, an enhanced multiple state context dependent Hidden Markov Model (HMM) is defined or trained to have a reduced number of possible observation distributions for those state(s) that are less affected by contextual dependency(ies). This is referred herein as an enhanced HMM to distinguish from typical HMMs. Reducing the number of possible observation distributions for those state(s) that are less affected by contextual dependency(ies) increases speech recognition accuracy in mismatched conditions thereby improving the robustness of the speech recognizer to environmental changes, while simultaneously reducing the computational requirements (e.g., memory, CPU resources, etc.) needed by the speech recognizer.

In some embodiments, the enhanced multiple state context dependent HMM includes a combination of one or more states that are context independent (e.g., those state(s) of the HMM which are less affected by contextual dependency(ies)) with one or more states that are context dependent.

In some embodiments, a non-uniform state clustering process is used that uses different clustering thresholds for different states. For those states that are less affected by contextual dependency, the value of the cluster threshold is such that more observation distributions are tied (clustered) as a result of the non-uniform state clustering process being performed, thereby reducing the total number of observation distributions for those states. In other embodiments, one or more states of a multiple state context dependent HMM that are less affected by contextual dependency are defined to be context independent, thereby reducing the number of possible observation distributions for those states to a single one.

In some embodiments, one or more of the states of an enhanced context dependent HMM are defined or trained to remove the contextual dependency(ies) from those states (thereby having only a single observation distribution). In some embodiments, these states are fully tied (clustered) to have only a single observation distribution. By way of example, in some embodiments an enhanced N-state right biphone HMM, where N is at least two, is defined or trained to have an initial state, which is less affected by contextual dependency than the other state(s), to be context independent and thereby having only a single observation distribution. The body state(s) and/or the final state can be tied according to typical uniform decision tree clustering algorithms or uniform data driven clustering algorithms, or can be tied according to non-uniform clustering (which will be described in greater detail later herein), and will have more output observation distributions than the initial state. Thus in this embodiment, the initial state for the enhanced N-state right biphone HMM is context independent while the body state(s) and final state are context dependent.

In some embodiments, an enhanced N-state left biphone HMM, where N is at least two, is defined or trained to have a final state, which is less affected by contextual dependency than the other state(s), to be context independent and thereby having only a single observation distribution. The initial state and/or the body state(s) can be tied according to typical uniform decision tree clustering algorithms or uniform data driven clustering algorithms, or can be tied according to non-uniform clustering (which will be described in greater detail later herein), and will have more output observation distributions than the final state. Thus in these embodiments, the final state for the enhanced N-state left biphone HMM is context independent while the initial state and the body state(s) are context dependent. Thus, in some embodiments, the enhanced biphone HMMs are modified to combine elements of a context independent HMM and a context dependent HMM.

In some embodiments, right dominant N-state demiphones are enhanced to substantially reduce the number of possible observation distributions for the body state(s). For example, the body state(s) may be defined or trained to be context independent, or may be more heavily clustered as compared with the body state(s) of typical right dominant demiphones. Similarly, in some embodiments left dominant N-state demiphones are enhanced to substantially reduce the number of possible observation distributions for the body state(s). For example, the body state(s) may be defined or trained to be context independent or may be more heavily clustered as compared with the body state(s) of typical left dominant demiphones.

In some embodiments, an enhanced N-state triphone HMM is defined having an initial state being context dependent only on the previous phone (unlike typical triphones where the initial state is context dependent on both the previous phone and the subsequent phone); one or more body state(s) being context dependent on the previous phone and the subsequent phone; and the final state being context dependent only on the subsequent phone (unlike typical triphones where the final state is context dependent on both the previous phone and subsequent phone).

In some embodiments, a parallel system combination N-state triphone HMM is used that combines one or more of the following: an N-state left biphone (either typical or enhanced), an N-state right biphone (either typical or enhanced), an N-state triphone (either typical or enhanced), and a monophone. In the parallel system combination N-state triphone HMM, new state connectivities are established to allow the speech training module to automatically search and select the best context dependent HMM topology for matched and/or mismatched conditions; and allows the speech recognizer to dynamically determine which is the best path across the different HMMs.

FIG. 1 is a block diagram illustrating exemplary components of the computing device 110, which is used to train data for a speech recognition application according to one embodiment. According to one embodiment, training is performed in lab conditions and need not be performed by the end user (however training may be performed by the end user to adapt the training to their particular environment).

The computing device 110 includes the speech recognizer training module 150 that trains HMMs for use by a speech recognizer. The speech recognizer training module 150 generates a number of observation distributions for an HMM based on training data. In some embodiments, the speech recognizer training module 150 performs a standard training algorithm (e.g., Expectation Maximization, Baum Welch, discriminative training, etc.). The speech recognizer training module 150 is coupled with the training database 120, the digital signal processor 125, the dictionary 130, the word transcription 135, the HMM configuration specification store 140, and the trained HMM store 145. The training database 120 stores prerecorded sounds that may include general conversations, general purpose read speech, and sounds specific for the speech recognition application. In some embodiments, the training database 120 data has been transcribed into a particular set of speech units (e.g., into phones, words, function words, syllables, etc.).

In some embodiments, the sounds in the training database 120 are enhanced or modified by the digital signal processor 125 in an attempt to account for certain environmental conditions to increase the robustness of the speech recognizer due to changing environmental conditions. For example, the digital signal processor 125 may perform robustness techniques including feature transformation and normalization, noise attenuation, speech enhancement, and/or HMM back-end noise compensation on the data in the training database 120. In addition, the digital signal processor 125 may perform feature extraction to extract feature vectors (a portion of audio over a period of time) from the training database 120.

The dictionary 130 includes words, sentences, commands, instructions, narrations, or other audible sounds that are supported for speech recognition by the system. The word transcription 135 includes word transcriptions of the speech data in the training database 120. The HMM configuration specification store 140 includes configuration specifications that include configuration information for one or more HMMs that defines the model topology, transition parameters, and output distribution parameters. In some embodiments, configuration information includes one or more of the following: the state configuration for each state of the HMM (e.g., for each state identifying if it is context independent or context dependent (and what the context is dependent on), state connectivity, number of desired mixed Gaussians, and a non-uniform cluster threshold for one or more states). The non-uniform cluster threshold may be different across the states of a phone. The non-uniform cluster threshold is used when tying observation distributions to reduce the number of observation distributions. A fully tied state has only a single observation distribution (essentially creating a monophone state). In some embodiments, the value of the non-uniform cluster thresholds for the different states of an HMM is configurable. In some embodiments, other parameters of the HMM are also configurable (e.g., the state configuration, state connectivity, number of states, left-right biphones, demiphones, triphones, number of states, phone definition, etc.).

In one embodiment, a particular HMM is selected for training (e.g., an enhanced left or right biphone, an enhanced triphone, etc.) and the speech recognizer training module 150 trains the HMMs to estimate the parameters of the HMM and stores the trained HMM in the trained HMM store 145. In one embodiment, the speech recognizer training module 150 includes the non-uniform state clustering module 155 that uses non-uniform cluster thresholds to cluster, which is sometimes referred herein as tying, observation distributions that are acoustically similar in order to reduce the number of observation distributions in the states.

In one embodiment, the non-uniform state clustering is a non-uniform tree-based clustering mechanism. In other embodiments, the non-uniform state clustering is done using a non-uniform data driven clustering algorithm. In both non-uniform tree-based clustering and non-uniform data driven clustering, a non-uniform cluster threshold is defined for at least some of the states of an HMM and at least one of the non-uniform cluster thresholds for that HMM has a different value than other non-uniform cluster threshold(s) for that HMM.

In one embodiment for non-uniform tree-based clustering, the decision tree is a binary tree in which a yes/no phonetic question is associated with each node. Each question includes a phone characteristic (such as "vowel," "nasal,", "consonant", etc.), and a corresponding dependency characteristic (such as "left" or "right"). The question at each node is designed to maximize the log-likelihood gain, which describes the improvement in the ability to describe the training data. This process continues until the log-likelihood gain falls below the non-uniform cluster threshold. Depending on the answer to the questions, the states that share the same leaf node are then tied. In one embodiment, the non-uniform state clustering process builds a decision tree for each state, and there may be a different non-uniform cluster threshold per state (e.g., per initial state, body state(s), and/or final states).

In one embodiment, the non-uniform state clustering is a non-uniform data driven clustering technique. The non-uniform data driven clustering technique is performed using a top-down hierarchical procedure to cluster each state in a non-uniform fashion. In one embodiment for non-uniform data-driven clustering, initially all possible states are placed in individual clusters. Using a distance metrics the closest clusters are merged together iteratively. The process is repeated until the distance between two clusters reaches a defined non-uniform threshold per state or until a non-uniform number of clusters per state is obtained.

In some embodiments, the computing device 110 is a device with constrained resources (e.g., a game console, a cellular telephone, a smartphone, a laptop, a palmtop, a tablet, a workstation, a personal computer, an entertainment robot, a set-top box, a television, an audio receiver, a GPS device, or other electronic devices with limited resources), while in other embodiments the computing device 110 is used for training HMMs that are used by a speech recognition system with constrained resources.

Figure 2:
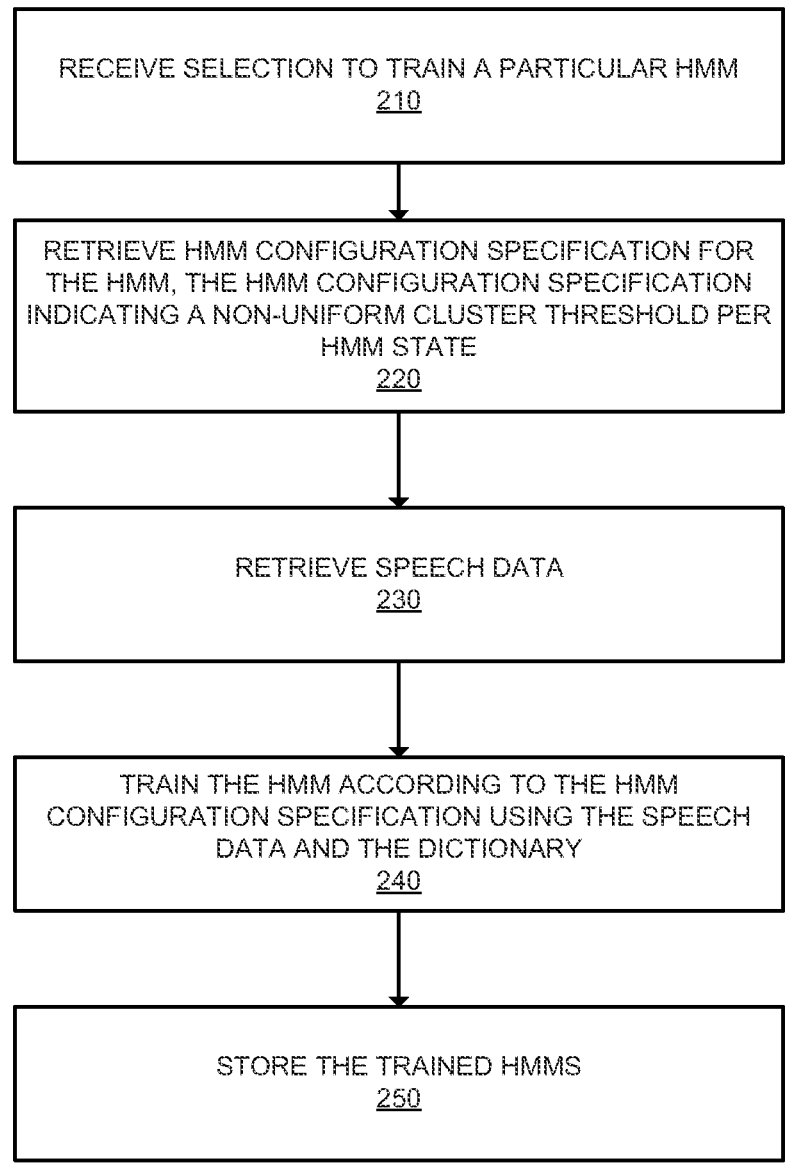
FIG. 2 is a flow diagram illustrating exemplary operations performed during training of an HMM according to one embodiment.

FIG. 2 is a flow diagram illustrating exemplary operations performed during training of an HMM according to one embodiment. The operations of FIG. 2 will be described with reference to the exemplary embodiment of FIG. 1. However, it should be understood that the operations of FIG. 2 can be performed by embodiments other than those discussed with reference to FIG. 2, and the embodiments discussed with reference to FIG. 1 can perform operations different than those discussed with reference to FIG. 2.

At block 210, the speech recognizer training module 150 receives a selection to train an HMM (e.g., an enhanced left or right biphone HMM, an enhanced triphone HMM, an enhanced demiphone HMM, a parallel system combination HMM, etc.). This selection may be received from a human or it may be received from an automated program. For example, although not shown in FIG. 1 for simplicity reasons, the training system may include an interface (e.g., a command line interface, a graphical user interface) that allows users to configure the training, including selecting HMMs to train. According to one embodiment, the HMMs are defined in the HMM configuration specification store 140. Exemplary HMMs according to embodiments of the invention will be described with reference to FIGS. 3-10. Flow then moves to block 220.

At block 220, the speech recognizer training module 150 retrieves the HMM configuration specification for the selected HMM from the HMM configuration specification store 140. In some embodiments, the HMM configuration specification includes one or more of the following: the number of states, the state configuration for each state of the HMM (e.g., for each state identifying if it is context independent or context dependent (and what the context is dependent on), state connectivity, number of desired mixed Gaussians, and a non-uniform cluster threshold for one or more states that is used in a non-uniform state clustering process).

In some embodiments, right and/or left biphone HMMs are defined or trained to substantially reduce the number of possible observation distributions for those states that are empirically insignificant with respect to contextual phonetic dependency(ies) (e.g., by eliminating those contextual dependency for those states or more heavily tying those states). As indicated through an analysis of triphone clustering decision trees, the initial state of a biphone HMM mainly depends on the previous phone and the final state mainly depends on the subsequent phone. Moreover, through spectrographic analysis, the end of a phone more significantly depends on the subsequent phone and the beginning of a phone depends on the previous phone.

Thus, the empirically insignificant contextual phonetic dependencies generally occur in the initial state for right biphones and the final state for left biphones. Therefore, in some embodiments of the invention, for enhanced right biphones, the contextual phonetic dependency in the initial state is eliminated (e.g., the initial state is defined to be context independent or is fully tied by a non-uniform state clustering process) or the initial state is more heavily tied (as compared with the body state(s), the final state, and with the initial state of typical right biphones) to substantially reduce the number of possible observation distributions for the initial state; and for enhanced left biphones, the contextual phonetic dependency in the final state is eliminated (e.g., the final state is defined to be context independent or is fully tied by a non-uniform state clustering process) or the final state is more heavily tied (as compared with the initial state, the body state(s), and the final state of typical left biphones) to substantially reduce the number of possible observation distributions for the final state.

In embodiments where a non-uniform state clustering process is performed for enhanced right biphones, the non-uniform cluster threshold(s) for the initial and/or body states are defined such that the number of observation distributions for those state(s) is one (e.g., it is fully tied) or are substantially reduced as compared with the final state, and with corresponding initial and body state(s) of typical right biphones. In embodiments where a non-uniform state clustering process is performed for enhanced left biphones, the non-uniform cluster threshold(s) for the final and/or body states are defined such that the number of observation distributions for those state(s) is one (e.g., it is fully tied) or are substantially reduced as compared with the initial state, and with corresponding body state(s) and the final state of typical left biphones.

The empirically insignificant contextual phonetic dependencies for triphones generally occur in the initial state (the subsequent phone dependency is empirically insignificant) and the final state (the previous phone dependency is empirically insignificant). Therefore, in some embodiments of the invention, triphones are enhanced by eliminating the contextual phonetic dependency on the subsequent phone in the initial state and eliminating the contextual phonetic dependency on the previous phone in the final state. For example, in some embodiments, the enhanced triphone HMM is defined such that the initial state is context dependent only on the previous phone, the body state(s) are context dependent on the previous phone and the subsequent phone, and the final state is context dependent only on the subsequent phone.

Demiphones may also be enhanced by reducing the number of possible observation distributions for those states that have empirically insignificant contextual phonetic dependencies. For example, empirically insignificant contextual phonetic dependencies generally occur in the body state(s) of demiphones (both in non-dominant demiphones and in right and left dominant demiphones). Therefore, in some embodiments, the contextual phonetic dependency of the subsequent phone in the body state(s) of right dominant demiphones is eliminated or the number of observation distributions for the body state(s) is substantially reduced as compared with the final state of the enhanced right dominant demiphone and with the body state(s) of typical right dominant demiphones. For example, in some embodiments, the body state(s) of the right dominant demiphone are defined to be context independent (the initial state remains context dependent on the previous phone and the final state remains context dependent on the subsequent phone). In other embodiments, a non-uniform clustering process is performed that uses non-uniform cluster thresholds defined for the body state(s) and that reduces the number of observation distributions for the body state(s) to be one (e.g., it is fully tied) or substantially reduces them as compared with the final state of the enhanced right dominant demiphone and with the body state(s) of typical right dominant demiphones (e.g., it is more fully tied than typical right dominant demiphones and more fully tied than the final state of the enhanced right dominant demiphone).

Similarly, in some embodiments, the contextual phonetic dependency of the previous phone in the body state(s) of left dominant demiphones is eliminated or the number of observation distributions for the body state(s) is substantially reduced as compared with the initial state of the enhanced left dominant demiphone and with the body state(s) of typical left dominant demiphones. For example, in some embodiments the body state(s) of the left dominant demiphone are defined to be context independent (the initial state remains context dependent on the previous phone and the final state remains context dependent on the subsequent phone). In other embodiments, a non-uniform clustering process is performed that uses non-uniform cluster thresholds defined for the body state(s) and that reduces the number of observation distributions for the body state(s) to be one (e.g., it is fully tied) or substantially reduces them as compared with the initial state of the enhanced left dominant demiphone and with the body state(s) of typical left dominant demiphones (e.g., it is more fully tied than typical left dominant demiphones and more fully tied than the initial state of the enhanced left dominant demiphone).

In some embodiments, the selected HMM is a parallel system combination HMM that combines two or more different HMMs (e.g., left biphones (enhanced or typical), right biphones (enhanced or typical), monophones, triphones (enhanced or typical), etc.). The parallel system combination HMM includes new state connectivities that allow the training module 150 to automatically search and select the best context dependent HMM topology for matched and/or mismatched conditions. The training module 150 may prune (remove) those states from the parallel system combination HMM topology that are not selected during training.

Referring back to FIG. 2, flow moves from block 220 to block 230, where the speech recognizer training module 150 retrieves speech data (e.g., from the training database 120). The speech data may be prerecorded and may be enhanced and/or modified in an attempt to account for certain environmental conditions (e.g., different types of noise, reverberation, noise attenuation, feature transformation, HMM back-end noise compensation, etc.).

Flow then moves to block 240, where the speech recognizer training module 150 trains the HMM according to the parameters defined in the HMM configuration specification using the speech data from the training database 120 and the dictionary 130.

In embodiments where the HMM configuration specification includes non-uniform cluster threshold(s), the training includes the non-uniform state clustering module 155 performing a non-uniform state clustering process to significantly reduce the number of observation distributions for those states whose contextual phonetic dependencies are empirically insignificant. The number of possible observation distributions for a given state after the non-uniform state clustering process is performed depends on the value of the non-uniform cluster threshold associated with that state. The number of possible observation distributions may be reduced to one, which eliminates the contextual dependency of that state, given a sufficiently high non-uniform cluster threshold. In some embodiments, a non-uniform cluster threshold for at least some of the states of the selected HMM is used to more heavily tie those states of the HMM that are less affected by contextual dependency. Decreasing the number of output observations reduces the computational requirements necessary for the speech recognition system (e.g., it reduces the memory footprint of the speech recognizer, it requires less CPU resources, etc.) and also improves the speech recognition accuracy in mismatched conditions.

In embodiments where the selected HMM is a parallel system combination HMM, the parallel system combination module 160 of the training module 150 uses the state connectivities to automatically search and select the best context dependent HMM topology for matched and/or mismatched conditions. The parallel system combination module 160 may prune (remove) those states from the parallel system combination HMM which are not selected during training (which depends on the speech training data).

After training is complete, flow moves from block 240 to block 250 where the trained HMMs are stored in the trained HMM store 145, which will be used during speech recognition by a speech recognizer, which will be described in greater detail with respect to FIGS. 11 and 12.

Figure 3:
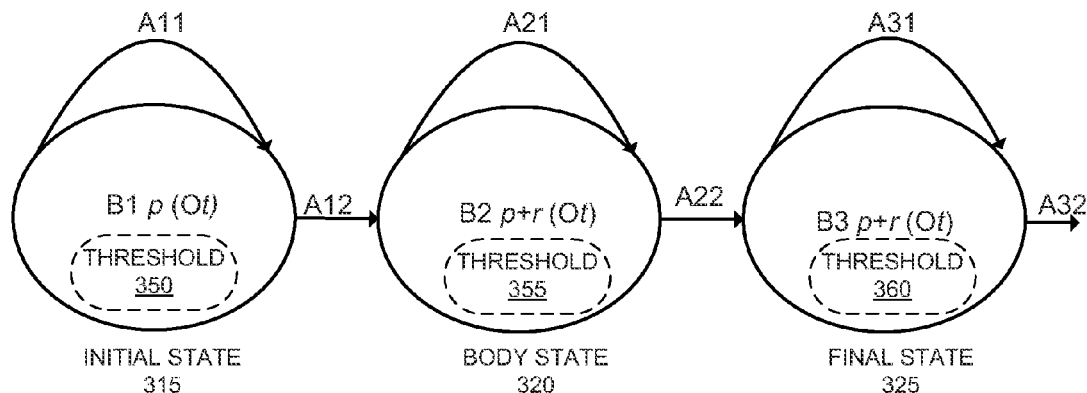
FIG. 3 illustrates an exemplary enhanced right biphone HMM according to one embodiment.

FIG. 3 illustrates an exemplary enhanced right biphone HMM 310 according to one embodiment. The HMM 310 includes the initial state 315, the body state 320, and the final state 325. The three state HMM 310 models the beginning, nucleus, and end of the phone respectively. Although the HMM 310 includes three states, it should be understood that there may be more or less number of states in different embodiments. As illustrated in FIG. 3, each base phone is represented with state transition probabilities {Aip} and output observation probability distributions {Bip(Ot)}. The output observation distributions are typically multivariate mixtures of Gaussian distributions, and determine the probability of generating observation Ot at time t. The output observations are identified by the state index i and the phone index p, and the input observation at a time t.

Each state in a standard right biphone HMM that models a particular base phone p is context dependent on the subsequent neighbor phone r (the neighbor to the right of the base phone p). Thus, the observation distributions for each state in a standard right biphone HMM are associated with the base phone and the subsequent phone. Although the number of observation distributions can be limited by applying a uniform decision tree clustering algorithm or a uniform data driven clustering algorithm, these algorithms use a uniform cluster threshold that is the same across each of the states. As a result, these algorithms may result in the number of observation distributions being too large for some of the states (e.g., if the uniform cluster threshold is relatively small) resulting in unnecessary and redundant observation distributions in states less affected by contextual dependency, which reduces the accuracy of the speech recognizer in mismatched conditions (e.g., it may be overtrained to the local training conditions) and increases its memory footprint; or it may result in the number of observation distributions being too small for some of the states (e.g., if the uniform cluster threshold is relatively large), which may cause those states that are more affected by contextual dependency to be too general resulting in decreased accuracy of the speech recognizer in matched and mismatched conditions.

The initial state of a biphone HMM (representing the beginning of the phone) mainly depends on the on the previous phone. Thus, for the initial state, the contextual dependency with the subsequent phone is not likely to be significant. As such, in the enhanced right biphone HMM 310, the contextual phonetic dependency of the initial state 315 has been eliminated and is essentially treated like a monophone state. Accordingly, there is only a single observation distribution for the initial state 315. As illustrated in FIG. 3, the base phone represented in the body state 320 and the final state 325 are dependent on the subsequent phone (indicated by p+r). Reducing the number of observation distributions for the initial state for the right biphone HMM 310 not only reduces the memory footprint of the speech recognizer and requires less CPU resources, it also increases the accuracy of the speech recognizer in mismatched conditions (situations where the environment of the real use is different from the environment and/or simulated environment during training).

In one embodiment, to reduce the number of observation distributions for the initial state 315 to a single observation distribution, a non-uniform cluster threshold 350 is defined such that the initial state 315 will be fully tied (i.e., have a single observation distribution) as a result of a non-uniform clustering process being performed. For example, the non-uniform cluster threshold 350 is set to infinity or a very large value. The non-uniform cluster thresholds 355 and 360 of the body state 320 and the final state 325 respectively will reduce the number of observation distributions for those states and are different from the non-uniform cluster threshold 350. The non-uniform cluster thresholds 355 and 360 may be the same value or may be a different value (e.g., the threshold 355 may be larger or smaller than the threshold 360). In one embodiment, the values of the non-uniform cluster thresholds 355 and 360 are such that the final state 325 has approximately two-thirds more observation distributions than the body state 320.

In another embodiment, the initial state 315 is defined in the HMM configuration specification for the right biphone HMM 310 to be context independent, thereby reducing the number of possible observations distributions to a single one. In such an embodiment, the non-uniform threshold 350 is not required to be defined, however the non-uniform thresholds 355 and 360 may be defined (the thresholds may be the same value or they may be different).

Figure 4:
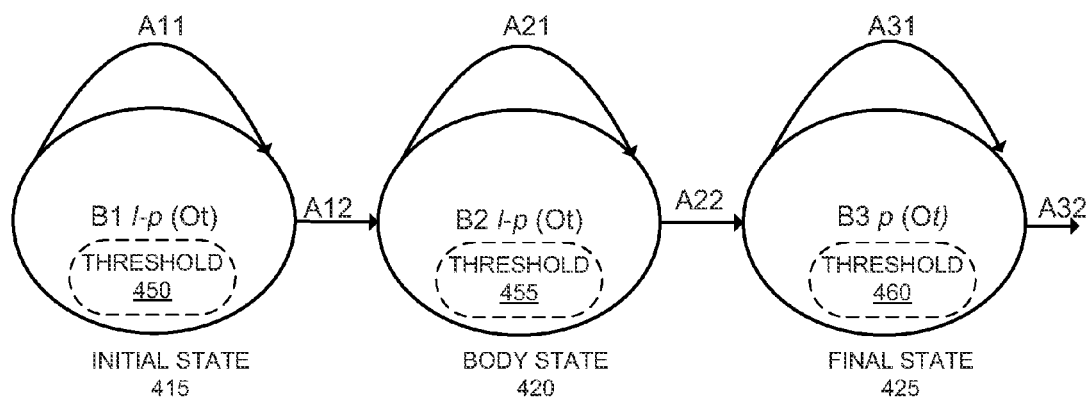
FIG. 4 illustrates an exemplary enhanced left biphone HMM according to one embodiment.

A similar mechanism may be used to enhance left biphone HMMs according to one embodiment. FIG. 4 illustrates an exemplary enhanced left biphone HMM 410 according to one embodiment. The HMM 410 includes the initial state 415, the body state 420, and the final state 425. The three state HMM 410 represents the beginning, nucleus, and end of the phone respectively. Although the HMM 410 includes three states, it should be understood that there may be more or less number of states in different embodiments.

Each state in a standard left biphone HMM that models a particular base phone p is context dependent on the previous neighbor phone l (the neighbor to the left of the base phone p). Thus, the observation distributions for each state in a standard left biphone HMM are associated with the base phone and its preceding phone. Although the number of observation distributions can be limited by applying a uniform decision tree clustering algorithm or a uniform data driven clustering algorithm, these algorithms use a uniform cluster threshold that is the same across each of the states. As a result, these algorithms may result in the number of observation distributions being too large for some of the states (e.g., if the uniform cluster threshold is relatively small) resulting in unnecessary and redundant observation distributions in states less affected by contextual dependency, which reduces the accuracy of the speech recognizer in mismatched conditions (e.g., it may be overtrained to the local training conditions) and increases its memory footprint; or it may result in the number of observation distributions being too small for some of the states (e.g., if the uniform cluster threshold is relatively large), which may cause those states that are more affected by contextual dependency to be too general resulting in decreased accuracy of the speech recognizer in matched and mismatched conditions.

However, the final state of a biphone HMM (modeling the end of the phone) mainly depends on the on the subsequent phone. Thus, for the final state, the contextual dependency with the previous phone is not likely to be significant. As such, in the enhanced left biphone HMM 410, the contextual phonetic dependency of the final state 415 has been eliminated and is essentially treated like a monophone state. Accordingly, there is only a single observation distribution for the final state 415. As illustrated in FIG. 4, the base phone represented in the initial state 415 and the body state 420 are dependent on the previous phone (indicated by l-p). Reducing the number of observation distributions on the final state for the left biphone HMM not only reduces the memory footprint of the speech recognizer, it also increases the accuracy of the speech recognizer in mismatch conditions (situations where the environment of the real use is different from the environment and/or simulated environment during training).

In one embodiment, to reduce the number of observation distributions for the final state 425 to a single observation distribution, a non-uniform cluster threshold 460 is chosen such that the final state 425 will be fully tied (i.e., have a single observation distribution) as a result of a non-uniform state clustering process being performed. For example, the non-uniform cluster threshold 460 is set to infinity or a very large number. The non-uniform cluster thresholds 450 and 455 of the initial state 415 and the body state 420 respectively will reduce the number of observation distributions for those states and are different than the non-uniform cluster threshold 460. The non-uniform cluster thresholds 450 and 455 may be the same value or may be a different value (e.g., the threshold 450 may be larger or smaller than the threshold 455). In one embodiment, the values of the non-uniform cluster thresholds 450 and 455 are such that the initial state 415 has approximately two-thirds more observation distributions than the body state 420.

In another embodiment, the final state 425 is defined in the HMM configuration specification for the left biphone HMM 410 to be context independent, thereby reducing the number of possible observations distributions to a single one. In such an embodiment, the non-uniform threshold 460 is not required to be defined, however the non-uniform thresholds 450 and 455 may be defined (the thresholds may be the same value or they may be different).

Figure 5:
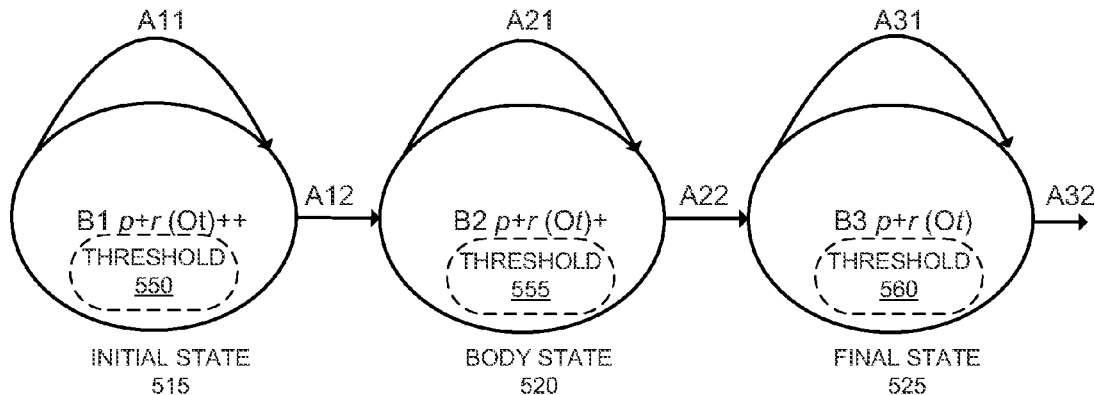
FIG. 5 illustrates an alternative exemplary enhanced right biphone HMM according to one embodiment.

FIG. 5 illustrates an alternative exemplary enhanced right biphone HMM 510 according to one embodiment. The enhanced right biphone HMM 510 differs from the right biphone HMM 310 in that the initial state 515 has more than a single observation distribution and is contextually dependent on the subsequent phone. In addition, the body state 520 has more observation distributions than the initial state 515, but less observation distributions than the final state 525. As illustrated in FIG. 5, the "+" symbol represents the relative amount that a state is tied. Thus, the initial state 515 is tied more than the body state 520, which is tied more than the final state 525. Thus, the number of observation distributions in the states of the right biphone hmm 510 progressively decrease the more that the contextual phonetic dependencies become insignificant. In other words, clustering is more heavily performed over the states that are less affected by contextual dependency.

The value of the non-uniform cluster threshold 550 is such that the number of observation distributions in the initial state 515 are substantially reduced as compared with typical right biphones as a result of a non-uniform clustering process being performed (e.g., the threshold is higher than typical uniform cluster thresholds in typical right biphones). The non-uniform cluster threshold 555 is larger than the non-uniform cluster threshold 560 (which are both smaller than the non-uniform cluster threshold 550). In one embodiment, the values of the non-uniform cluster thresholds 555 and 560 are such that the final state 525 will have approximately two-thirds more observation distributions than the body state 520. Although FIG. 5 illustrates the body state 520 being more tied than the final state 525, embodiments are not so limited. For example, the body state 520 and the final state 525 may be equally tied (e.g., the non-uniform cluster thresholds for the body state 520 and the final state 525 may be the same value). While FIG. 5 illustrates three states, it should be understood that there may me more or less states in different embodiments.

Figure 6:
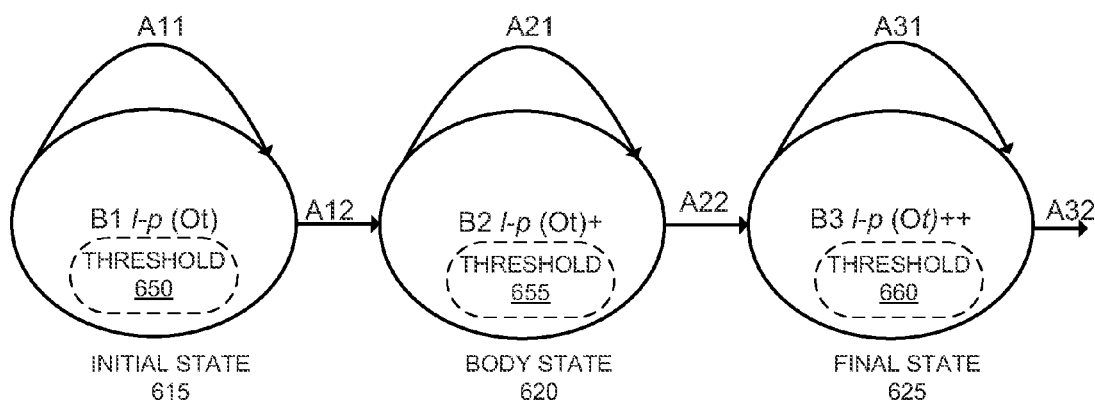
FIG. 6 illustrates an alternative exemplary enhanced left biphone HMM according to one embodiment.

FIG. 6 illustrates an alternative exemplary enhanced left biphone HMM 610 according to one embodiment. The enhanced left biphone HMM 610 differs from the left biphone HMM 410 in that the final state 625 has more than a single observation distribution and is contextually dependent on the previous phone. In addition, the body state 620 has more observation distributions than the final state 625, but less observation distributions than the initial state 615. As illustrated in FIG. 6, the "+" symbol represents the relative amount that a state is tied. Thus, the final state 625 is more tied than the body state 620, which is more tied than the initial state 615. Thus, the number of observation distributions in the states of the left biphone hmm 610 progressively decrease the more that the contextual phonetic dependencies become insignificant. Thus, clustering is more heavily performed over the states that are less affected by contextual dependency.

The value of the non-uniform cluster threshold 660 is such that the number of observation distributions in the final state 625 are substantially reduced as compared with typical left biphones as a result of a non-uniform clustering process being performed (e.g., the threshold is higher than typical thresholds in typical left biphones). The non-uniform cluster threshold 655 is larger than the non-uniform cluster threshold 650 (which are both smaller than the non-uniform cluster threshold 660). In one embodiment, the values of the non-uniform cluster thresholds 650 and 655 are such that the initial state 615 will have approximately two-thirds more observation distributions than the body state 620. Although FIG. 6 illustrates the body state 620 being more tied than the initial state 615, embodiments are not so limited. For example, the body state 620 and the initial state 615 may be equally tied (e.g., the non-uniform cluster thresholds for the body state 620 and the initial state 650 may be the same value). While FIG. 6 illustrates three states, it should be understood that there may me more or less states in different embodiments.

Figure 7:
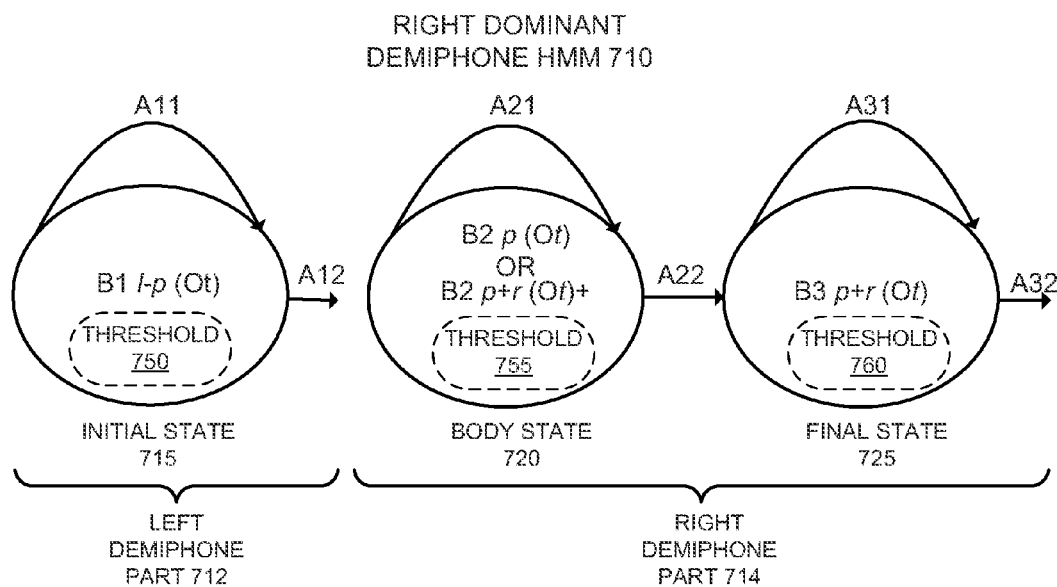
FIG. 7 illustrates an exemplary enhanced right dominant demiphone HMM according to one embodiment.

Embodiments of the invention are not limited to biphone HMMs. FIG. 7 illustrates an exemplary enhanced right dominant demiphone HMM according to one embodiment. The enhanced right dominant demiphone HMM 710 includes the initial state 715, the body state 720, and the final state 725. The initial state 715 is included in the left demiphone part 712 and the body state 720 and the final state 725 are included in the right demiphone part 714. The initial state 715 is contextually dependent on the previous phone while the final state 725 is contextually dependent on the subsequent phone. In some embodiments, the body state 720 is contextually independent (e.g., it is fully tied and has only a single observation distribution). In other embodiments, the body state 720 is contextually dependent on the subsequent phone, but is more heavily tied than the final state 725 (e.g., the non-uniform cluster threshold 755 is greater than the non-uniform cluster threshold 760). Thus in these embodiments, the final state 725 has more observation distributions than the body state 720. It should be understood that in typical right dominant demiphones, the cluster threshold is the same across each of the states (thus the same threshold is applied to the body state and the final state). In some embodiments the non-uniform cluster threshold 750 has the same value as the non-uniform cluster threshold 760, while in other embodiments they are different.

While FIG. 7 illustrates three states, it should be understood that there may me more or less states in different embodiments.

In another embodiment, the body state 720 is defined in the HMM configuration specification for the right dominant demiphone HMM 710 to be context independent, thereby reducing the number of possible observations distributions to a single one. In such an embodiment, the non-uniform threshold 755 is not required to be defined, however the non-uniform thresholds 750 and 760 may be defined (the thresholds may be the same value or they may be different).

Figure 8:
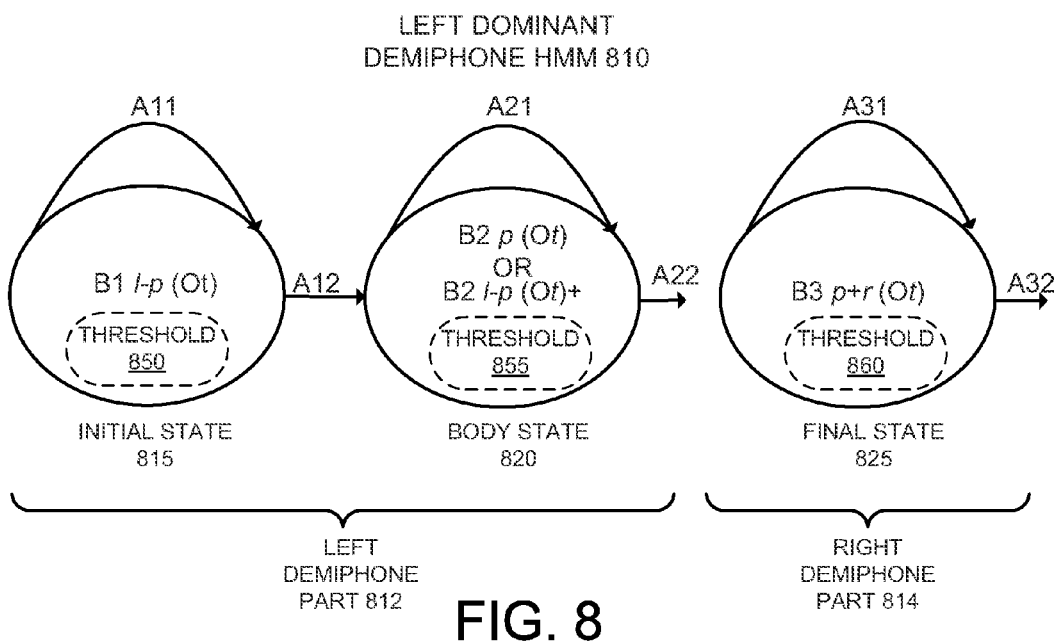
FIG. 8 illustrates an exemplary enhanced left dominant demiphone HMM according to one embodiment.

A similar mechanism can be performed for left dominant demiphone HMMs. FIG. 8 illustrates an exemplary enhanced left dominant demiphone HMM according to one embodiment. The enhanced left dominant demiphone HMM 810 includes the initial state 815, the body state 820, and the final state 825. The initial state 815 and the body state 820 are included in the left demiphone part 812 and the final state 825 is included in the right demiphone part 814. The initial state 815 is contextually dependent on the previous phone while the final state 825 is contextually dependent on the subsequent phone. In some embodiments, the body state 820 is contextually independent (e.g., it is fully tied and has only a single observation distribution). In other embodiments, the body state 820 is contextually dependent on the previous phone, but is more heavily tied than the initial state 815 (e.g., the non-uniform cluster threshold 855 is greater than the non-uniform cluster threshold 850). Thus in these embodiments, the initial state 815 has more observation distributions than the body state 820. It should be understood that in typical left dominant demiphones, the non-uniform cluster thresholds for the initial state and the body state are the same. In some embodiments the non-uniform cluster threshold 850 has the same value as the non-uniform cluster threshold 860, while in other embodiments they are different. While FIG. 8 illustrates three states, it should be understood that there may me more or less states in different embodiments.

In another embodiment, the body state 820 is defined in the HMM configuration specification for the left dominant demiphone HMM 810 to be context independent, thereby reducing the number of possible observations distributions to a single one. In such an embodiment, the non-uniform threshold 855 is not required to be defined, however the non-uniform thresholds 850 and 860 may be defined (the thresholds may be the same value or they may be different).

While FIGS. 7 and 8 illustrate a right and left dominant demiphone, embodiments of the invention are not limited to right or left dominant demiphones. For example, demiphones that are not right or left dominant may be enhanced by reducing the number of possible observation distributions in the body state(s) in a similar as described with respect to the enhanced right and left dominant demiphones in some embodiments.

Figure 9:
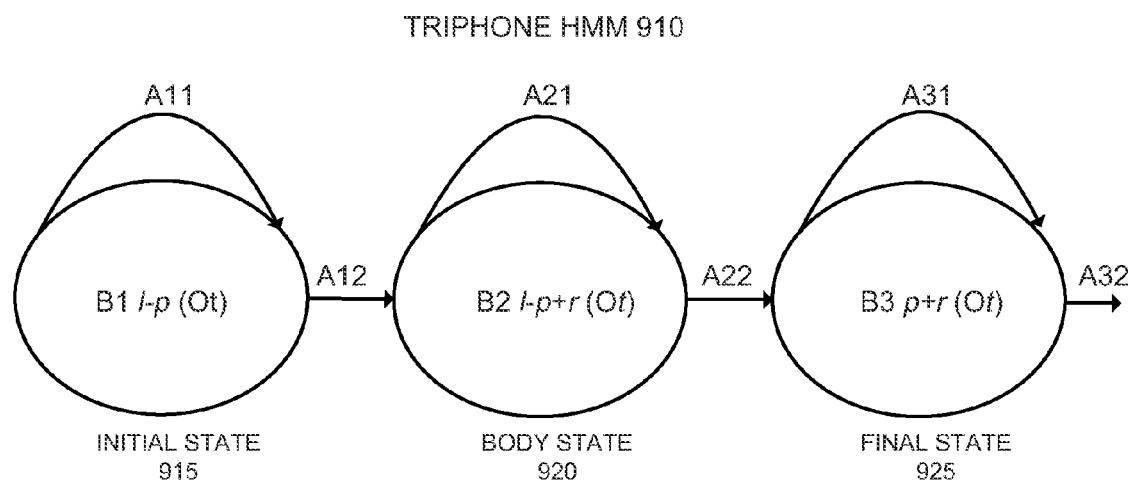
FIG. 9 illustrates an exemplary enhanced triphone HMM according to one embodiment.

In some embodiments, triphone HMMs are enhanced by eliminating the empirically insignificant contextual phonetic dependencies. FIG. 9 illustrates an exemplary enhanced triphone HMM according to one embodiment. The enhanced triphone HMM 910 reduces the empirically insignificant contextual phonetic dependencies through an elimination of the subsequent phone dependency in the initial state 915 and the previous phone dependency in the final state 925. In one embodiment, the HMM configuration specification for the triphone HMM 910 is defined with the initial state 915 being context dependent only on the previous phone (and not also on the subsequent phone like a typical triphone state), the body state 920 being context dependent on the previous and subsequent phone, and the final state 925 being context dependent only on the subsequent phone (and not also on the previous phone like a typical triphone state). Thus, unlike typical triphones where each state is dependent on the previous phone and the subsequent phone, the initial state 915 is only dependent on the previous phone (indicated by l−p) and the final state 925 is only dependent on the subsequent phone (indicated by p+r). The body state 920 remains dependent on the previous phone and the subsequent phone (indicated by l−p+r). Thus, the number of possible observation distributions for the initial state 915 and the final state 925 are reduced as compared with standard triphones. While FIG. 9 illustrates each of the states being context dependent on at least one context, in other embodiments one or more of the states may be context independent. While FIG. 9 illustrates three states, it should be understood that there may me more or less states in different embodiments. In addition, non-uniform clustering thresholds for the initial state 915, body state 920, and final state 925 can also be used during a non-uniform clustering process as previously described.

Figure 10:
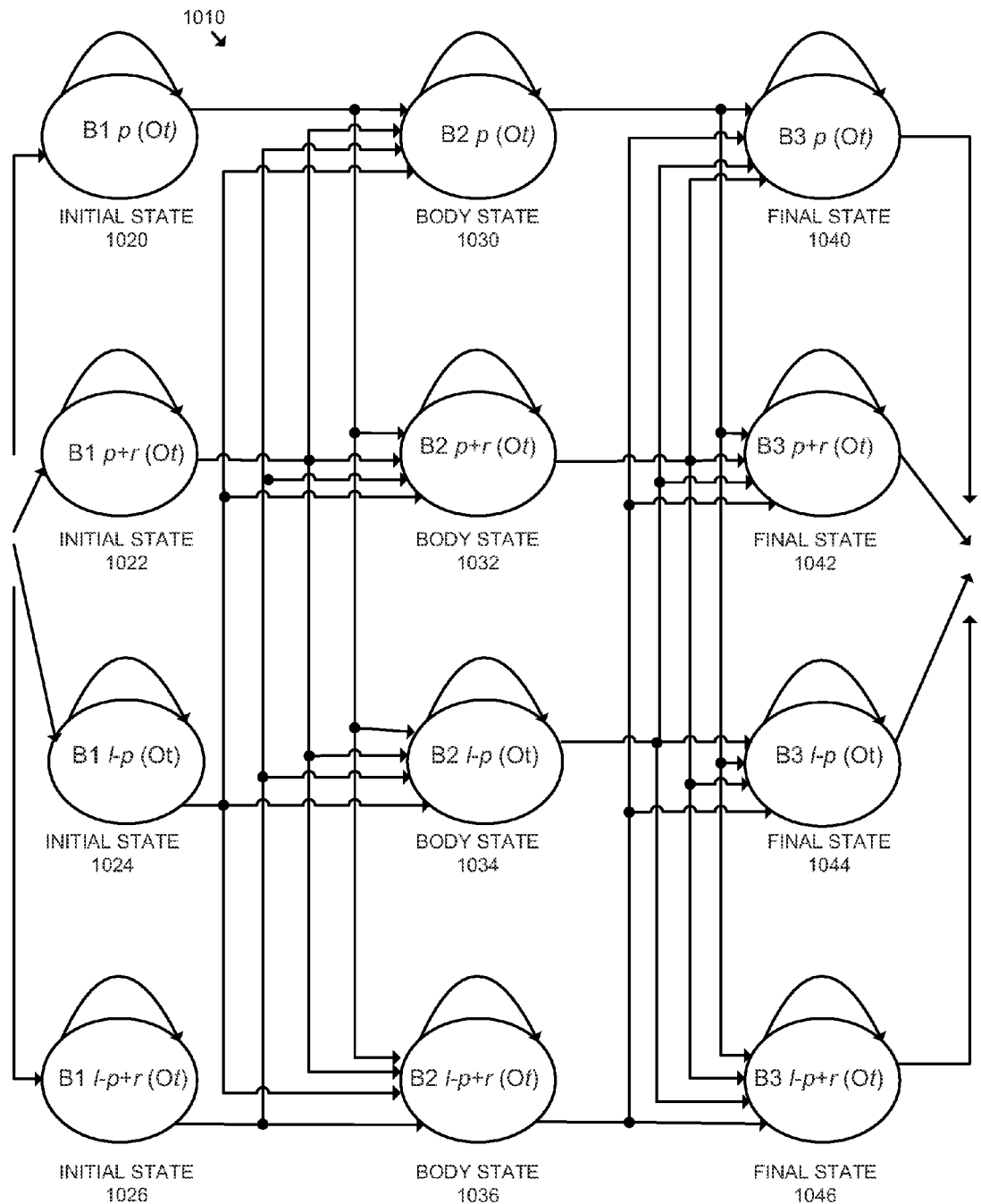
FIG. 10 illustrates an exemplary parallel system combination HMM that combines a monophone, a left biphone, a right biphone, and a triphone, according to one embodiment.

In some embodiments, a parallel system combination of different HMMs may be used to improve accuracy in all conditions (matched conditions and mismatched conditions). FIG. 10 illustrates an exemplary parallel system combination HMM 1010 that combines enhanced left and right biphones, a monophone, and a triphone, according to one embodiment. In addition, new state connectivities between the different HMMs are defined to allow the training module 150 to automatically search and select the best context dependent HMM topology for matched and/or mismatched conditions. The training module 150 may prune (remove) those states from the topology of the parallel system combination HMM 1010 that are unlikely to be selected during training. By way of example, FIG. 10 illustrates the parallel system combination HMM 1010 as it is defined in its corresponding HMM configuration specification. However, depending on the speech data used during training, the training module 150 may prune those of the states that have a low probability of selection during training and store the resulting trained parallel system combination HMM in the trained HMM store 145. In some embodiments the training process is performed iteratively where the best states in the parallel system combination HMM 1010 are selected and retrained (e.g., using standard Expectation Maximization, Baum Welch, discriminative training algorithms, etc.) to optimize the training for those states to further improve system accuracy and performance of the parallel system combination HMM 1010. The speech recognizer uses the trained parallel system combination HMM to dynamically determine the best likely path of topology of the trained parallel system combination.

As illustrated in FIG. 10, the parallel system combination HMM 1010 combines a monophone HMM (including the initial state 1020, the body state 1030, and the final state 1040), a right biphone HMM (including the initial state 1022, the body state 1032, and the final state 1042), a left biphone HMM (including the initial state 1024, the body state 1034, and the final state 1044), and a triphone HMM (including the initial state 1026, the body state 1036, and the final state 1046). The initial state 1020 is context independent, the initial state 1022 is contextually dependent on the subsequent phone, the initial state 1024 is contextually dependent on the previous phone, and the initial state 1026 is contextually dependent on the previous phone and the subsequent phone. Each of the initial states 1020, 1022, 1024, and 1026 has a transition to each of the body states 1030, 1032, 1034, and 1036. The body state 1030 is context independent, the body state 1032 is contextually dependent on the subsequent phone, the body state 1034 is contextually dependent on the previous phone, and the body state 1036 is contextually dependent on the previous and subsequent phone. Each of the body states 1030, 1032, 1034, and 1036 has a transition to each of the final states 1040, 1042, 1044, and 1046. The final state 1040 is context independent, the final state 1042 is contextually dependent on the subsequent phone, the final state 1044 is contextually dependent on the previous phone, and the final state 1046 is contextually dependent on the previous and subsequent phone.

As illustrated in FIG. 10, the right biphone, left biphone, and triphone are typically defined. However, embodiments are not so limited as one or more of the right biphone, left biphone, and triphone may be enhanced as described herein. It should be understood that the number of states, number of HMMs, the state connectivities, the context dependency, the state configuration of each state (whether each state is context independent, previous context dependent, subsequent context dependent, previous and subsequent context dependent) as illustrated in FIG. 10 is exemplary, and different topologies and combinations may be used in different embodiments.

Figure 11:
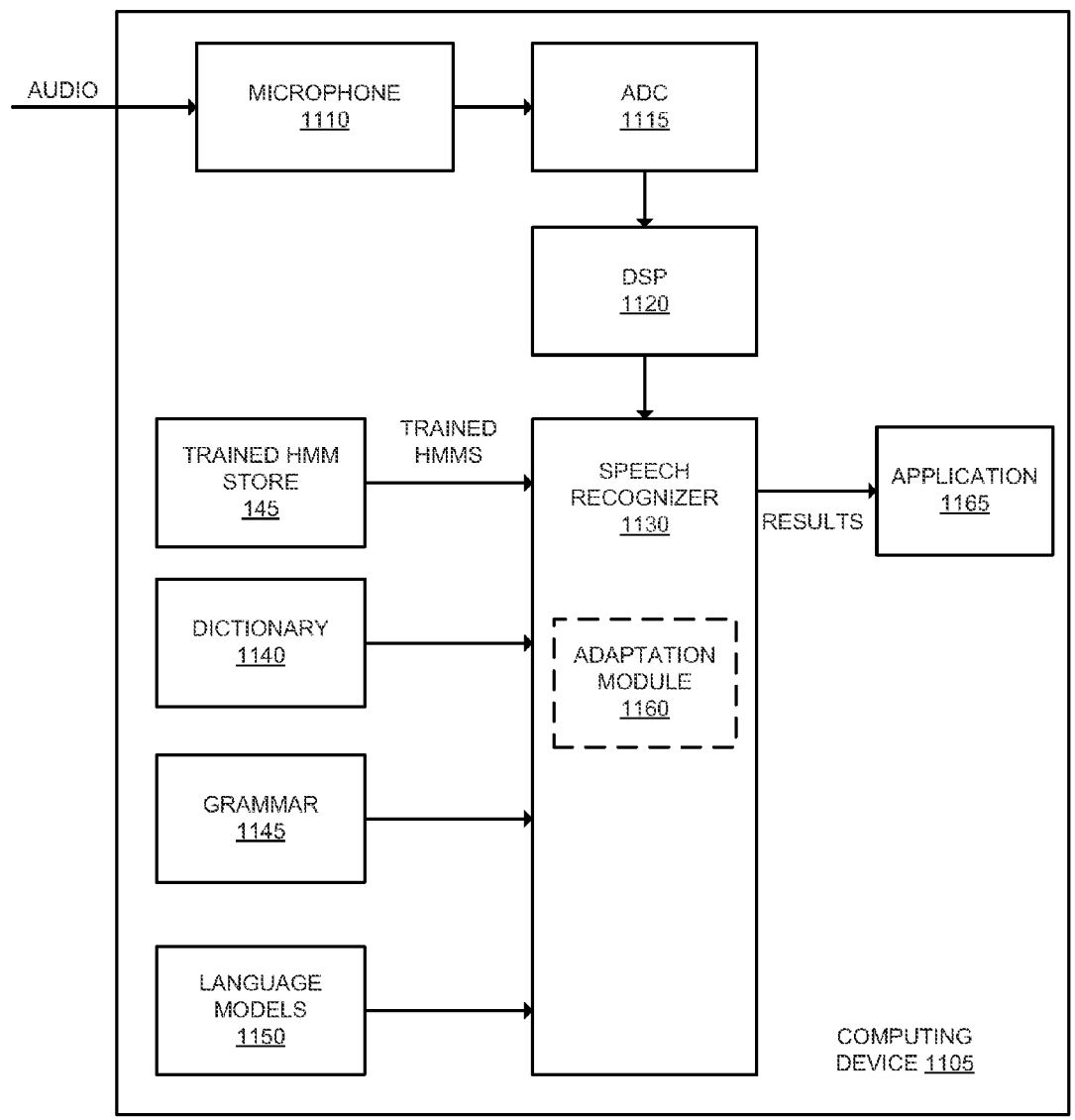
FIG. 11 an exemplary computing device that includes a speech recognizer to recognize speech for an application according to one embodiment.

FIG. 11 illustrates an exemplary computing device that includes a speech recognizer to recognize speech for an application according to one embodiment. In some embodiments, the computing device 1105 is a device with constrained resources (e.g., a game console, a cellular telephone, a smartphone, a laptop, a palmtop, a tablet, a workstation, a personal computer, an entertainment robot, a set-top box, a television, an audio receiver, a GPS device, or other electronic devices with limited resources). The functionally of the application 1165 depends on the nature of the computing device 1105. For example, the application may be an office suite (e.g., word processing, spreadsheet processing, etc.), video game and/or video game system, operating system, a multimedia application, etc. In some embodiments, the features of the computing device 110 may be included in the computing device 1105 (e.g., the computing device 1105 may also include a speech recognizer training module), while in other embodiments the speech recognizer training is performed on a device remote to the computing device 1105.

The computing device 1105 uses the microphone 1110 to detect audio sound (e.g., which may include commands or other sounds related to the application 1165 and/or environmental sounds (e.g., background noise, etc.)). The analog audio signal is converted by the analog-to-digital converter (ADC) 1115 into digital data. The digital audio data is processed by the digital signal processor (DSP) 1120. For example, the digital signal processor 1120 generates feature vectors (a portion of audio over a period of time) from the digital data. The digital signal processor 1120 may also perform feature transformation and normalization, noise attenuation, speech enhancement, and/or HMM back-end noise compensation on the digital data.

The unknown audio data is then processed by the speech recognizer 1130 to recognize speech components (e.g., words, sentences, commands, instructions, etc.) defined in the dictionary 1140 that are applicable to the application 1165. In one embodiment, each speech component in the dictionary 1140 is associated with a corresponding phone string (one or more phones). The speech recognizer 1130 uses trained HMM(s) stored in the trained HMM store 145 to identify a series of phones from the input audio data. The trained HMM(s) may correspond to the enhanced HMMs described with reference to FIGS. 3-10.

The speech recognizer 1130 uses the dictionary 1140 to recognize speech components that correspond to the identified phone strings. The speech recognizer 1130 uses the grammar 1145 or the language models 1150 to form the recognized speech components into word sequences, sentences, phrases, commands, for use by the application 1165 (e.g., to perform a command or action, display on a screen, etc.).

In some embodiments, the speech recognizer 1130 also includes the adaptation module 1160 that allows the speaker (user of the application 1165) to adapt the training of the HMM(s) stored in the trained HMM store 145 to their voice and/or environment. The adaptation module 1160 increases the accuracy of the speech recognition system and allows the speech recognition system to train for the particular environment and/or speaker. While in one embodiment the adaption is performed automatically (e.g., periodically and without speaker intervention), in other embodiments the adaptation is performed at the request and interactively with the speaker. In embodiments, the adaption module 1160 adapts the enhanced HMMs described in FIGS. 3-10.

Figure 12:
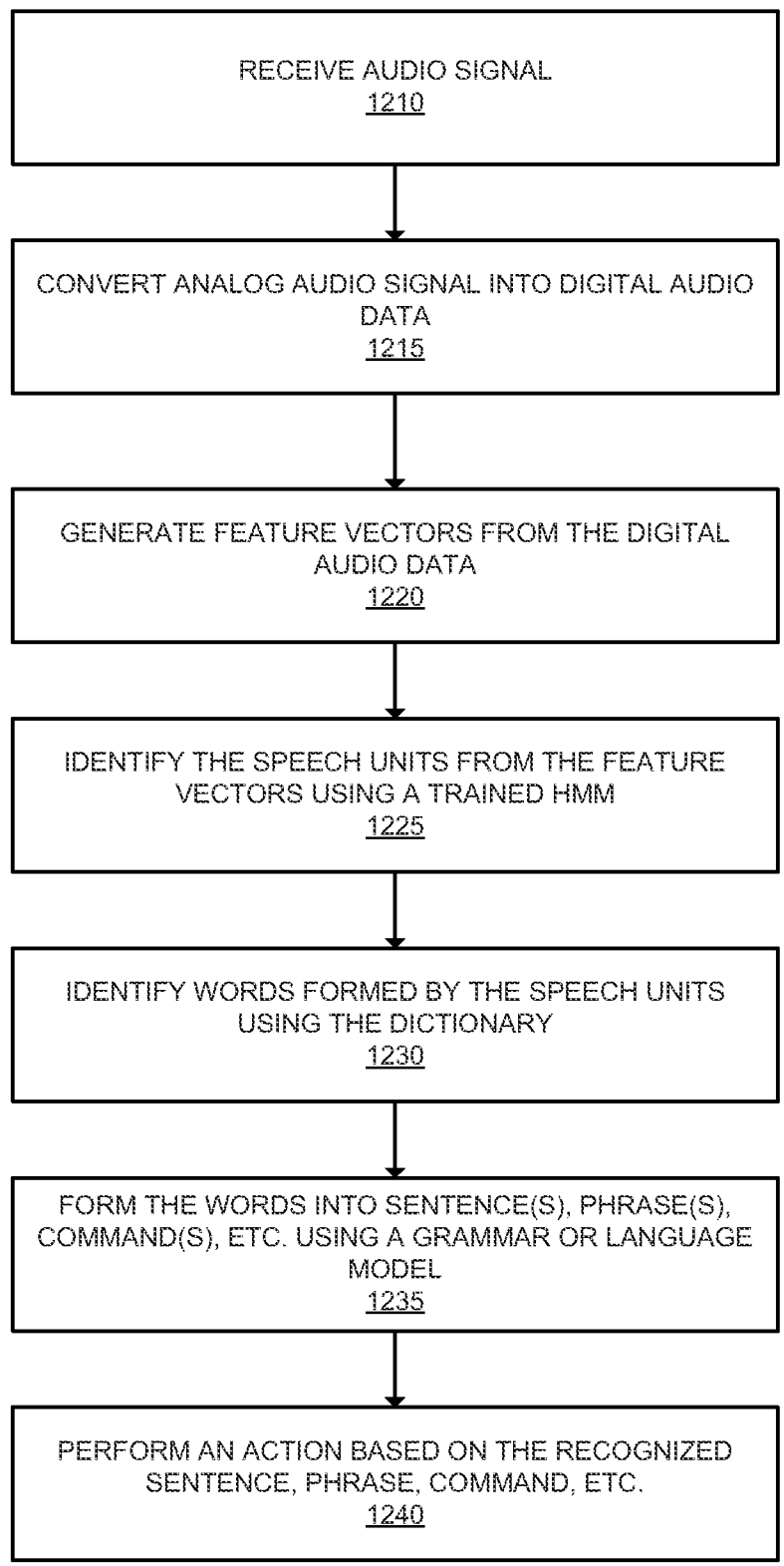
FIG. 12 is a flow diagram illustrating exemplary operations performed during speech recognition according to one embodiment.

FIG. 12 is a flow diagram illustrating exemplary operations performed during speech recognition according to one embodiment. The operations of FIG. 12 will be described with reference to the exemplary embodiment of FIG. 11. However, it should be understood that the operations of FIG. 12 can be performed by embodiments other than those discussed with reference to FIG. 12, and the embodiments discussed with reference to FIG. 11 can perform operations different than those discussed with reference to FIG. 12.

At block 1210, the computing device 1105 receives an audio signal at the microphone 1110. The audio signal may include speech components for the application 1165 and/or environmental sounds. Flow moves to block 1215 where the ADC 1115 converts the audio signal into digital audio data. Flow then moves to block 1220 where the DSP 1120 generates feature vectors from the digital audio data. In some embodiments the DSP 1120 also performs feature transformation and normalization, noise attenuation, speech enhancement, and/or HMM back-end noise compensation on the digital audio data. Flow moves from block 1220 to block 1225.

At block 1225, the speech recognizer 1130 identifies the speech units from the feature vectors using one or more trained HMMs from the trained HMM store 145. The trained HMM(s) are enhanced HMM(s) described in greater detail with respect to FIGS. 3-10. Flow then moves to block 1230, where the speech recognizer 1130 evaluates the speech units against the dictionary 1140 to identify words. Flow then moves to block 1235 where the speech recognizer 1130 uses the grammar 1145 or a language model 1150 to form the words into sentences, phrases, commands, etc., for use by the application 1165. Flow then moves to block 1240 where the application 1165 performs an action based on the recognized sentence, phrase, command, etc.

Since the speech recognizer 1130 uses an enhanced HMM during speech recognition, it is more robust to environmental changes. In addition, if the enhanced HMM reduces the number of observation distributions, the speech recognizer will require less memory and CPU resources to perform speech recognition.

Figure 13:
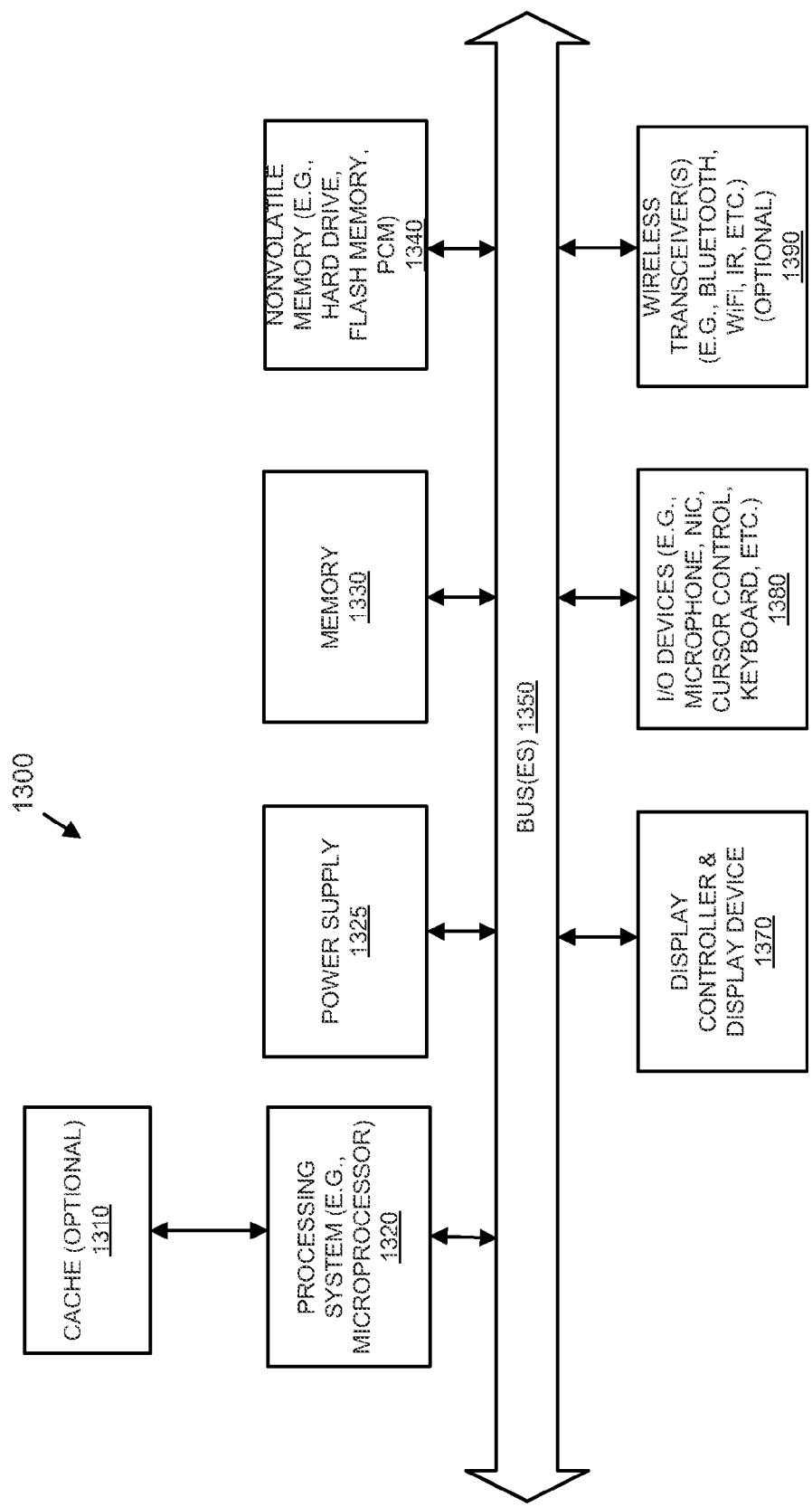
FIG. 13 is a block diagram illustrating an exemplary data processing system which may be used in some embodiments.

FIG. 13 is a block diagram illustrating an exemplary data processing system which may be used in some embodiments. According to one embodiment, the exemplary architecture of the data processing system 1300 may be included in the computing device 110 and/or computing device 1105. The data processing system 1300 may be a game console, a cellular telephone, a smartphone, a laptop, a palmtop, a tablet, a workstation, a personal computer, an entertainment robot, a set-top box, a television, an audio receiver, a GPS device, or other data processing system.

The data processing system 1300 includes the processing system 1320, which may include one or more microprocessors and/or a system on an integrated circuit. The processing system 1320 is coupled with an optional cache memory 1310, a power supply 1325 (which may include one or more batteries), a volatile memory 1330 (e.g., RAM), a nonvolatile memory 1340 (e.g., a hard drive, a flash drive, PCM (Phase Change Memory), etc.), a display controller and display device 1370, input/output devices 1380, and optional wireless transceiver(s) 1390 through one or more buses 1350. It will be appreciated that additional components, not shown in FIG. 13, may also be a part of the data processing system 1300 in certain embodiments, and in certain embodiments fewer components than shown in FIG. 13 may be used. In addition, it will be appreciated that one or more buses, not shown in FIG. 13, may be used to interconnect the various components as is well known in the art.

The memory 1330 and/or 1340 may store data and/or programs for execution by the data processing system 1300. For example, the memory 1330 and/or 1340 may store instructions performed by the for the speech recognizer training module 150 and the speech recognizer 1130. The input/output devices 1380 may include a microphone and/or a speaker to, for example, receive audio for speech recognition and output sound. The input/output devices 1380 may also include a keypad, keyboard, touch panel, multi touch panel, or other was to allow a user to provide input to the system. The display controller and display device 1370 may include a graphical user interface (GUI). The wireless (e.g., RF) transceivers 1390, which is optional, (e.g., a WiFi transceiver, an infrared transceiver, a Bluetooth transceiver, a wireless cellular telephony transceiver, etc.) may be used to communicate with other data processing systems.

The techniques shown in the figures can be implemented using code and data stored and executed on one or more computing devices (e.g., a game console, a cellular telephone, a smartphone, a laptop, a palmtop, a tablet, a workstation, a personal computer, an entertainment robot, a set-top box, a television, an audio receiver, a GPS device, or other data processing system.). Such computing devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a microphone, a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

One or more parts of embodiments may be implemented using different combinations of software, firmware, and/or hardware. For example, the speech recognizer training module 150 and the speech recognizer 1130 may be implemented using different combinations of software, firmware, and/or hardware.

While embodiments have been described with respect to phone based recognizers, embodiments are not so limited as other types of speech recognizers that use different connectivities or other types of units (e.g., words, function words, syllables, begging and final syllables, etc.) may be used in some embodiments.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus to improve robustness to environmental changes of a context dependent speech recognizer for an application, comprising:
   a training database to store sounds for speech recognition training;
   a dictionary to store a plurality of words supported by the context dependent speech recognizer; and
   a speech recognizer training module to train a set of one or more multiple state Hidden Markov Models (HMMs) with use of the training database and the dictionary, wherein the speech recognizer training module is further to perform a non-uniform state clustering process on each of the states of each HMM, the non-uniform state clustering process using a different non-uniform cluster threshold for at least some of the states of each HMM to more heavily cluster and correspondingly reduce a number of observation distributions for those of the states of each HMM that are less empirically affected by one or more contextual dependencies.

2. The apparatus of claim 1, wherein at least one of the multiple state HMMs is a left biphone HMM having a final state whose contextual dependency has been eliminated, wherein the final state is a terminal model state of the left biphone and does not connect to any other states of the left biphone except itself.

3. The apparatus of claim 1, wherein at least one of the multiple state HMMs is a right biphone HMM having an initial state whose contextual dependency has been eliminated, wherein the initial state is an entry model state of the right biphone and does not have a connection from any other states except itself.

4. The apparatus of claim 1, wherein at least one of the multiple state HMMs is a left biphone HMM having an initial state, a body state, and a final state each having a different non-uniform cluster threshold, wherein the initial state is an entry model state that is not connected from any other states except itself, wherein the body state is an intermediary state between the initial state and the final state, and wherein the final state is a terminal model state that does not connect to any other states except itself, and wherein the non-uniform state clustering process more heavily clusters the final state than the body state and the initial state, and more heavily clusters the body state than the initial state.

5. The apparatus of claim 1, wherein at least one of the multiple state HMMs is a right biphone HMM having an initial state, a body state, and a final state each having a different non-uniform cluster threshold, wherein the initial state is an entry model state that is not connected from any other states except itself, wherein the body state is an intermediary state between the initial state and the final state, and wherein the final state is a terminal model state that does not connect to any other states except itself, and wherein the non-uniform state clustering process more heavily clusters the initial state than the body state and the final state, and more heavily clusters the body state than the final state.

6. The apparatus of claim 1,
wherein at least one of the multiple state HMMs is a multiple state triphone that includes at least an initial state, a body state, and a final state, wherein the initial state is an entry model state that is not connected from any other states except itself, wherein the body state is an intermediary state between the initial state and the final state, and wherein the final state is a terminal model state that does not connect to any other states except itself; and
wherein the speech recognizer training module is to train the multiple state triphone such that the initial state is context dependent only on a previous phone, the body state is context dependent on the previous phone and a subsequent phone, and the final state is context dependent only on the subsequent phone.

7. The apparatus of claim 1, wherein at least one of the multiple state HMMs is a demiphone including at least an initial state, a body state, and a final state, and wherein the body state is associated with a non-uniform cluster threshold, wherein the non-uniform state clustering process substantially reduces the number of observation distributions for the body state, wherein the initial state is an entry model state of a left demiphone part of the demiphone and is not connected from any other states except itself, wherein the final state is a terminal model state of a right demiphone part of the demiphone and that does not connect to any other states except itself, and wherein the body state is a different state than the initial state and the final state and is included in the left demiphone part or the right demiphone part.

8. The apparatus of claim 1, wherein at least one of the multiple state HMMs is a multiple state parallel system combination that combines one or more of a multiple state left biphone HMM, a multiple state right biphone HMM, a multiple state triphone, and at least one monophone in one of the states.

9. A method to improve robustness to environmental changes of a context dependent speech recognizer, comprising:
receiving a selection to train a Hidden Markov Model (HMM), the HMM having a plurality of states, and wherein at least some of the plurality of states are associated with a different non-uniform clustering threshold;
training the HMM including performing a non-uniform state clustering process on each of the plurality of states using the non-uniform clustering thresholds to more heavily cluster and correspondingly reduce a number of observation distributions for those of the plurality of states that are less empirically affected by one or more contextual dependencies; and
storing the trained HMM.

10. The method of claim 9, wherein the HMM is a right biphone and includes an initial state and one or more other states, wherein the initial state is an entry model state that is not connected from the one or more other states, wherein the initial state of the right biphone is associated with a non-uniform clustering threshold, and wherein the contextual dependency of the initial state is eliminated through application of the non-uniform threshold associated with the initial state during the non-uniform state cluster process.

11. The method of claim 9
wherein the HMM is a right biphone and includes at least an initial state, a body state, and a final state that are each associated with a different non-uniform clustering threshold, wherein the initial state is an entry model state that is not connected from any other states except itself, wherein the body state is an intermediary state between the initial state and the final state, and wherein the final state is a terminal model state that does not connect to any other states except itself; and
wherein the non-uniform state clustering process uses the different non-uniform clustering thresholds to more heavily cluster the initial state than the body state and the final state and to more heavily cluster the body state than the final state.

12. The method of claim 9, wherein the HMM is a left biphone and includes a final state and one or more other states, wherein the final state of the left biphone is associated with a non-uniform clustering threshold, wherein the final state is a terminal model state that does not connect to the one or more other states, and wherein the contextual dependency of the final state is eliminated through application of the non-uniform threshold associated with the final state during the non-uniform state cluster process.

13. The method of claim 9,
wherein the HMM is a left biphone and includes at least an initial state, a body state, and a final state that are each associated with a different non-uniform clustering threshold, wherein the initial state is an entry model state that is not connected from any other states except itself, wherein the body state is an intermediary state between the initial state and the final state, and wherein the final state is a terminal model state that does not connect to any other states except itself; and
wherein the non-uniform state clustering process uses the different non-uniform clustering thresholds to more heavily cluster the final state than the initial state and the body state and to more heavily cluster the body state than the initial state.

14. The method of claim 9,
wherein the HMM is a triphone that includes at least an initial state, a body state, and a final state, wherein the initial state is an entry model state that is not connected from any other states except itself, wherein the body state is an intermediary state between the initial state and the final state, and wherein the final state is a terminal model state that does not connect to any other states except itself; and
wherein the speech recognizer training module is to train the triphone such that the initial state is context dependent only on a previous phone, the body state is context dependent on the previous phone and a subsequent phone, and the final state is context dependent only on the subsequent phone.

15. The method of claim 9, wherein the HMM is a demiphone including at least an initial state, a body state, and a final state, wherein the initial state is an entry model state of a left demiphone part of the demiphone and is not connected from any other states except itself, wherein the final state is a terminal model state of a right demiphone part of the demiphone and that does not connect to any other states except itself, wherein the body state is a different state than the initial state and the final state and is included in the left demiphone part or the right demiphone part and wherein the body state is associated with a non-uniform cluster threshold, and wherein the non-uniform state clustering process substantially reduces the number of observation distributions for the body state.

16. An apparatus for speech recognition, comprising:
one or more processors;
a set of one or more trained Hidden Markov Models (HMMs) each having a plurality of states, wherein the set of trained HMMs have a reduced number of observation distributions for those states that are empirically less affected by one or more contextual dependencies through use of a non-uniform state clustering process that uses a non-uniform clustering threshold that is different for at least some of the plurality of states of each HMM; and
a speech recognizer to use one or more of the set of trained multiple state HMMs during speech recognition and to provide results to an application.

17. The apparatus of claim 16, wherein one of the set of trained HMMs is a left biphone that includes a final state that is context independent, and includes one or more other states that are context dependent, wherein the final state is a terminal model state of the left biphone and does not connect to any other states of the left biphone HMM except itself.

18. The apparatus of claim 16, wherein one of the set of trained HMMs is a right biphone that includes an initial state that is context independent, and includes one or more other states that are context dependent, wherein the initial state is an entry model state of the right biphone and does not have a connection from any other states except itself.

19. The apparatus of claim 16, wherein one of the set of trained HMMs is a triphone that includes at least an initial state that is context dependent only on a previous phone, a body state that is context dependent on the previous phone and a subsequent phone, and a final state that is context dependent only on the subsequent phone, wherein the initial state is an entry model state that is not connected from any other states except itself, wherein the body state is an intermediary state between the initial state and the final state, and wherein the final state is a terminal model state that does not connect to any other states except itself.

20. The apparatus of claim 16, wherein one of the set of trained HMMs is a demiphone including at least an initial state, a body state, and a final state, wherein the initial state is an entry model state of a left demiphone part of the demiphone and that is not connected from any other states except itself, wherein the final state is a terminal model state of a right demiphone part of the demiphone and that does not connect to any other states except itself, wherein the body state is a different state than the initial state and the final state and is included in the left demiphone part or the right demiphone part, wherein the body state is associated with a non-uniform cluster threshold, and wherein the non-uniform state clustering process substantially reduces the number of observation distributions for the body state.

21. The apparatus of claim 16,
wherein one of the set of trained HMMs is a parallel system combination HMM that establishes connectivities between two or more of a left biphone HMM, right biphone HMM, triphone HMM, and monophone HMM; and
wherein the speech recognizer is to dynamically determine which is a best path across the different HMMs in the parallel system combination HMM.

22. A method in a computing device to perform speech recognition, comprising:
receiving an audio signal;
converting the audio signal into a digital audio;
generating feature vectors from the digital audio;
identifying speech units from the feature vectors using a trained Hidden Markov Model (HMM) having a plurality of states, wherein the HMM has a reduced number of observation distributions for those states that are empirically less affected by one or more contextual dependencies through use of a non-uniform state clustering process that uses a non-uniform clustering threshold that is different for at least some of the states of the HMM;
identifying speech components formed by the speech units; and
providing the speech components to an application.

23. The method of claim 22, wherein the trained HMM is a left biphone that includes a final state that is context independent, and includes one or more other states that are context dependent, wherein the final state is a terminal model state of the left biphone and does not connect to the one or more other states.

24. The method of claim 22, wherein the trained HMM is a right biphone that includes an initial state that is context independent, and includes one or more other states that are context dependent, wherein the initial state is an entry model state of the right biphone and does not have a connection from the one or more other states.

25. The method of claim 22, wherein the trained HMM is a triphone that includes at least an initial state that is context dependent only on a previous phone, a body state that is context dependent on the previous phone and a subsequent phone, and a final state that is context dependent only on the subsequent phone, wherein the initial state is an entry model state that is not connected from any other states except itself, wherein the body state is an intermediary state between the initial state and the final state, and wherein the final state is a terminal model state that does not connect to any other states except itself.

26. The method of claim 22, wherein the trained HMM is a demiphone including at least an initial state, a body state, and a final state, wherein the initial state is an entry model state of a left demiphone part of the demiphone and is not connected from any other states except itself, wherein the final state is a terminal model state of a right demiphone part of the demiphone and that does not connect to any other states except itself, wherein the body state is a different state than the initial state and the final state and is included in the left demiphone part or the right demiphone part, wherein the body state is associated with a non-uniform cluster threshold, and wherein the non-uniform state clustering process substantially reduces the number of observation distributions for the body state.

27. The method of claim 22,
wherein the trained HMM is a parallel system combination HMM that establishes connectivities between two or more of a left biphone HMM, right biphone HMM, triphone HMM, and monophone HMM; and
dynamically determining which is a best path across the different HMMs of the parallel system combination HMM when identifying speech units from the feature vectors.

* * * * *